United States Patent
Toshiaki

(10) Patent No.: US 6,206,379 B1
(45) Date of Patent: Mar. 27, 2001

(54) SECOND PRESSURE RING FOR AL CYLINDERS AND ITS PRODUCING METHOD

(75) Inventor: Takao Toshiaki, Yono (JP)

(73) Assignee: Nippon Piston Ring Co., Ltd., Yono (JP)

(*) Notice: Subject to any disclaimer, the term of this patent is extended or adjusted under 35 U.S.C. 154(b) by 0 days.

(21) Appl. No.: 09/037,022

(22) Filed: Mar. 9, 1998

(30) Foreign Application Priority Data

Mar. 14, 1997 (JP) .................................................. 9-060265

(51) Int. Cl.⁷ .................................................. F16J 9/20
(52) U.S. Cl. .................................................. 277/436; 277/491
(58) Field of Search .................................................. 277/442, 452, 277/453, 456, 460, 436, 491

(56) References Cited

U.S. PATENT DOCUMENTS

| | | | |
|---|---|---|---|
| 3,926,166 | * 12/1975 | Packard | 277/453 X |
| 4,432,313 | * 2/1984 | Matlock | 277/456 X |
| 5,598,763 | * 2/1997 | Rao et al. | 277/456 X |
| 5,901,963 | * 5/1999 | Hite et al. | 277/460 X |

FOREIGN PATENT DOCUMENTS

| | | |
|---|---|---|
| 8-246087 | 9/1996 | (JP) . |
| 9-19757 | 1/1997 | (JP) . |

* cited by examiner

*Primary Examiner*—Anthony Knight
*Assistant Examiner*—Karlena D. Schwing
(74) *Attorney, Agent, or Firm*—Evenson, McKeown, Edwards & Lenahan, P.L.L.C.

(57) ABSTRACT

The present invention is for producing stably a second pressure ring which both keeps a lubricant-scraping property and prevents the cylinder side from being longitudinally scratched. According to the invention, a second pressure ring made of iron without plating thereon, of which the outer peripheral sliding surface is downwardly divergent and slanted, is provided in which the lower end of the outer peripheral sliding surface is worked upwardly divergently so as to slant in a range of less than 0.15 mm in its axial direction. The junction between the outer peripheral sliding surface and the slanted worked portion is lapped cylindrically for finishing.

8 Claims, 4 Drawing Sheets

SECOND PRESSURE RING FOR Al CYLINDERS AND ITS PRODUCING METHOD

FIELD OF THE INVENTION

The present invention relates to a second pressure ring to be mounted on a piston in internal combustion engines employing Al cylinders and a method for producing such a second pressure ring.

BACKGROUND OF THE INVENTION

In prior art techniques, as disclosed in Japanese laid-open Patent Gazette Nos. 246087/1996 and 19757/1997, as cylinder liners of reciprocating internal combustion engines, cylinder liners made of hyper-eutectic aluminum-silicon alloy by an aluminum alloy casting method (hereinafter, called Al cylinders) have been developed. Such liners are excellent in anti-abrasion property, have less consumption of lubricant and less abrasion on the piston, and promote light engine weight, and thus are increasingly being used.

A piston for such an Al cylinder is normally provided with a set of three piston rings. The three piston rings include a top ring (pressure ring) with a surface which is nitriding-treated, a second pressure ring of which the outer peripheral sliding surface is chromium-plated, and an oil ring forming a third ring (oil scraping ring). Incidentally, as opposed to an Al cylinder such as, for example, one made of A390 alloy, a pressure ring made of acicular cast iron without plating thereon could be employed as the second pressure ring.

The second pressure ring needs to be airtight for backing up the top ring and to provide a degree of scraping for scraping a little lubricant that the oil ring may possibly leave unscraped.

As for the second pressure ring, therefore, the outer periphery thereof should slant so as to be downwardly divergent or slant with an undercut, and the lowermost portion of its sliding surface should be formed with a sharp edged shape. On the other hand, in order to prevent the cylinder from being scratched, the sliding surface should be chromium-plated and the slant shaped surface should be polished to make the edged portion sharply and smoothly finished. Therefore, it has been hard in practice to satisfy requirements for both providing the scraping property and preventing longitudinal scratching of the bore (cylinder side).

SUMMARY OF THE INVENTION

An object of the invention is to provide a second pressure ring which keeps a scraping property and prevents the cylinder side from being scratched longitudinally, and a method for producing it.

A second pressure ring for Al cylinders according to the invention is made of iron without plating thereon and has the outer peripheral sliding surface thereof downwardly divergent so as to slant. The second pressure ring includes, at the lower end of the outer peripheral sliding surface, a slanting, upwardly divergently worked portion of less than 0.15 mm in its axial direction. The junction between the outer peripheral sliding surface and the slanting worked portion is lapped for finishing.

A method for producing a second pressure ring for Al cylinders, in which the outer peripheral sliding surface of the second pressure ring, made of iron without plating thereon is downwardly divergent so as to slant, comprises working upwardly divergently the lower end of the outer peripheral sliding surface of the second pressure ring in a range of less than 0.15 mm in its axial direction, and finishing by lapping cylindrically the junction between the outer peripheral sliding surface and the slanting worked portion.

A second pressure ring for Al cylinders according to the invention, made of iron without plating thereon and with the outer peripheral sliding surface thereof being downwardly divergent so as to slant, has the outer peripheral sliding surface buffed. The lower end of the outer peripheral sliding surface is lapped for finishing.

A method for producing a second pressure ring for Al cylinders according to the invention, in which the outer peripheral sliding surface of the second pressure ring made of iron without plating thereon is downwardly divergent so as to slant, comprises buffing the outer peripheral sliding surface, and then lapping cylindrically the lower end of the outer peripheral sliding surface for finishing.

A second pressure ring for Al cylinders according to the invention, made of iron without plating thereon and with the outer peripheral sliding surface thereof being downwardly divergent and slanting, has a resin coating of a thickness of 3 µm or more than 3 µm on the outer peripheral sliding surface.

A method for producing a second pressure ring for Al cylinders according to the invention, in which the outer peripheral sliding surface of the second pressure ring made of iron without plating thereon is downwardly divergent so as to slant, comprises applying a resin coating of a thickness of 3 µm or more than 3 µm on the outer peripheral sliding surface.

DESCRIPTION OF THE PREFERRED EMBODIMENTS

Figure 1A:
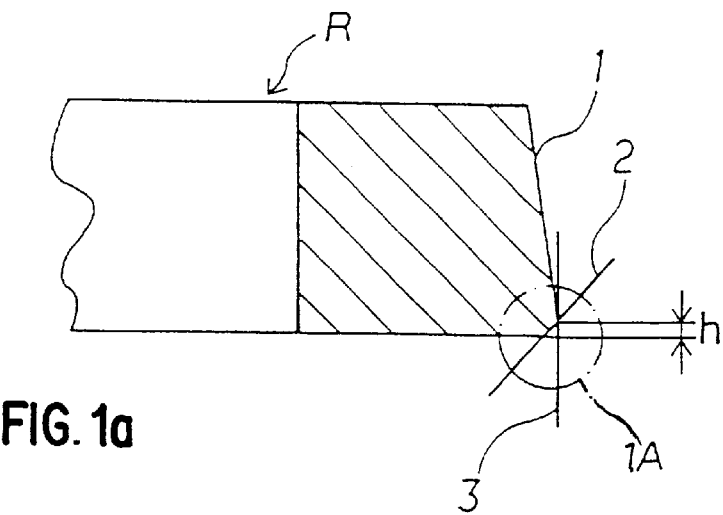
FIG. 1 is a sectional view of a second pressure ring showing the first embodiment of the invention.
Figure 1A:
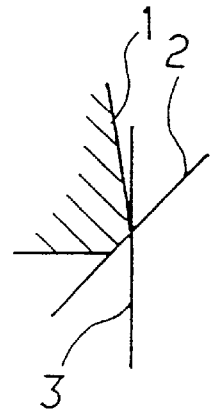
Figure 1B:
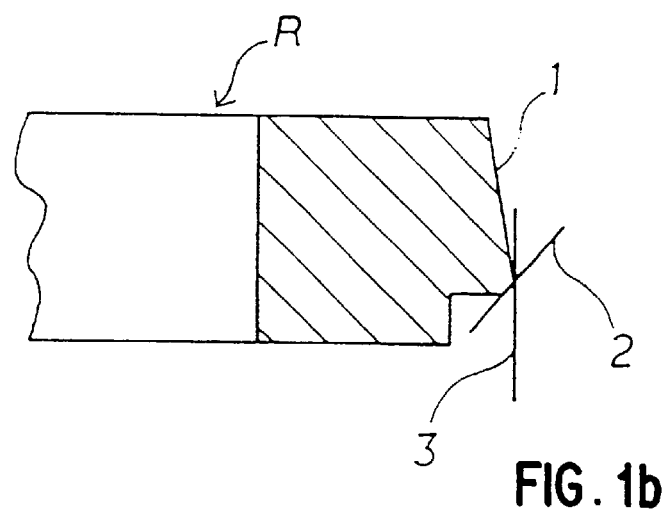
Figure 1C:
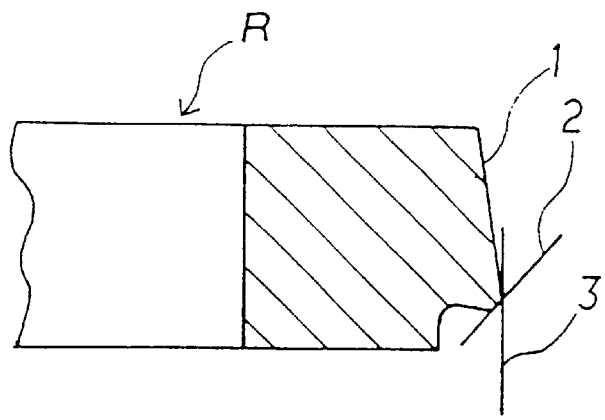

The invention will now be explained more fully by way of exemplary embodiments with reference to FIGS. 1–3.

FIG. 1 shows the first embodiment of the present invention. In FIG. 1, (a), (b) and (c) are respective partial cross sections, each showing a section and its vicinity of a second pressure ring R made of cast iron or steel (hereafter called "iron") without plating thereon embodied by the invention. More specifically, (a) shows an approximately trapezoidal sectional view with the outer peripheral sliding surface being downwardly divergently slanted, (b) shows an approximately trapezoidal sectional view having a stepped shaped undercut at the lowermost portion of the outer periphery, and (c) shows an approximately trapezoidal sectional view having a similar stepped shaped undercut of a hooked section (hereinunder called "underhook"). The described undercut or underhook portion serves to enlarge the oil receiving capacity, to control an elevation of oil pressure and to prevent possible reverse flow of lubricant when the second pressure ring scrapes remaining lubricant that the lower ring does not scrape off. In each case, the slant portion of the outer peripheral sliding surface will be similar. Therefore, as an example, the section shown in (a) will now be explained.

At first, as the first step, a downwardly divergent slant formation shown by reference numeral 1 is made by usual machining. Next, on the lower end of the outer peripheral sliding surface, an upwardly divergent slant working shown by reference numeral 2 is applied over the range represented by h in the axial direction (up and down direction in FIG. 1). Here, h is denoted by $$h=0.1\pm0.05 \text{ (mm)}.$$

If h exceeds this range, the oil scraping property deteriorates and the consumption of lubricant increases. Accordingly, h being out of this range is not desirable.

By application of the slant working 2, the downwardly divergent, slant formation of the outer peripheral sliding surface does not need a specially fine surface finishing and, therefore, can have a conventional surface roughness.

Cylindrical lapping 3 for finishing is then applied on the junction as an abutting portion between the slant formation 1 and the slant working 2. Finally, similar to a prior art technique, the entire second pressure ring is treated for anticorrosion by a treatment such as phosphate coating, etc., to bring the ring to completion.

Figure 2A:
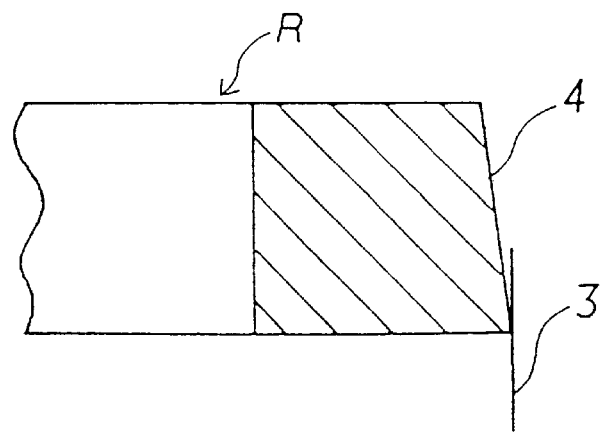
FIG. 2 is a sectional view of a second pressure ring showing the second embodiment of the invention.
Figure 2B:
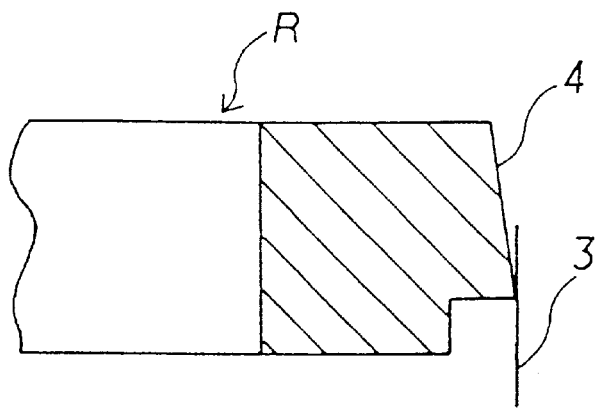
Figure 2C:
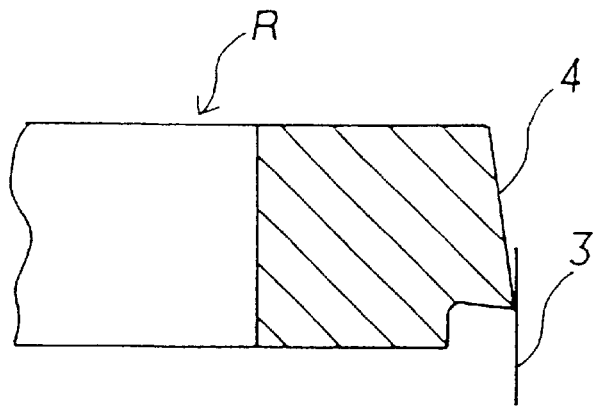

FIG. 2 shows the second embodiment of the present invention. In FIG. 2, (a), (b) and (c) are respective sections similar to those shown in FIG. 1. A partial cross-section (a), showing a section and its vicinity, of a second pressure ring R made of iron without plating thereon, shows an approximately trapezoidal section with the outer peripheral sliding surface thereof being a downwardly divergent slant formation. The section (b) shows an approximately trapezoidal section having a stepped shaped undercut at the lowermost portion of the outer periphery, and (c) shows an approximately trapezoidal section having a similarly stepped shaped underhook. Just like in the description of the first embodiment, the section shown in (a) will now be explained.

Firstly, the outer peripheral sliding surface is worked by usual machining or the like to form a downwardly divergent slant surface, and thereafter the whole peripheral sliding surface is buffed as shown by reference numeral 4 so as to remove possible "burrs" and "scraps" which may occur in the machining at the lowermost portion of the outer peripheral sliding surface. This buffing brings a smooth surface of less than 6.3 Z roughness at the sliding surface.

After that, on the lower end of the sliding surface, a cylindrical lapping 3 is applied for finishing, and then the entirety thereof is treated by a phosphate coating treatment in order to be brought to completion.

Figure 3A:
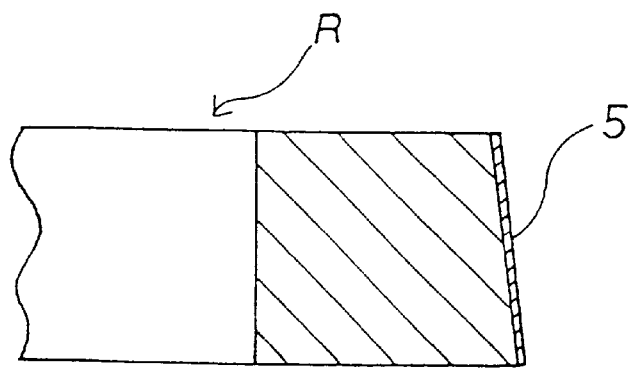
FIG. 3 is a sectional view of a second pressure ring showing the third embodiment of the invention.
Figure 3B:
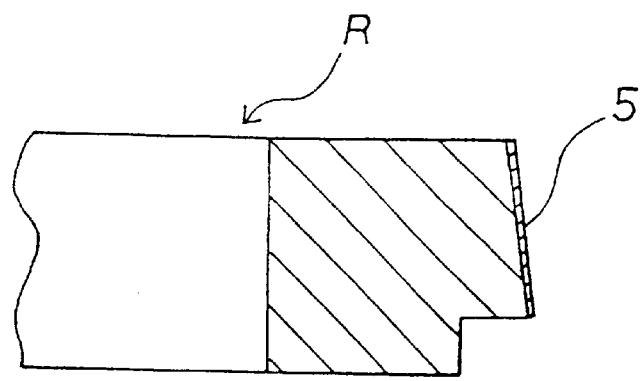
Figure 3C:
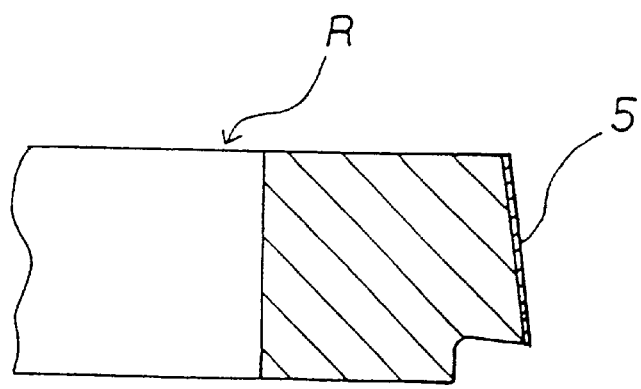

FIG. 3 shows the third embodiment of the present invention. In FIG. 3, (a), (b) and (c) are respective sections similar to those shown in FIGS. 1 and 2. A partial cross-section (a), showing a section and its vicinity, of a second pressure ring R made of iron without plating thereon, shows an approximately trapezoidal section with the outer peripheral sliding surface thereof being a downwardly divergently slant formation. The section (b) shows an approximately trapezoidal section having a stepped shaped undercut at the lowermost portion of the outer periphery, and (c) shows an approximately trapezoidal section having a similarly stepped shaped underhook. Hereinunder, the section shown in (a) will now be explained.

Firstly, the outer peripheral sliding surface is worked by usual machining or the like to form a downwardly divergent slant surface, and furthermore, the sliding surface is finished by liquid honing, etc. After that, a resin coating with a thickness of 3 mm or more, desirably of 5–10 μm, is applied on the whole sliding surface as shown by reference numeral 5. As the resin of this coating, 4-ethylene fluoride resin, etc., are adequate. Such resin coating, after application thereof, is baked to provide firm adhesion. In this case, subsequent finishing by lapping or a phosphate coating treatment is not needed.

The second pressure ring with such a resin coating is characterized by provision of good initial adaptation.

Figure 4:
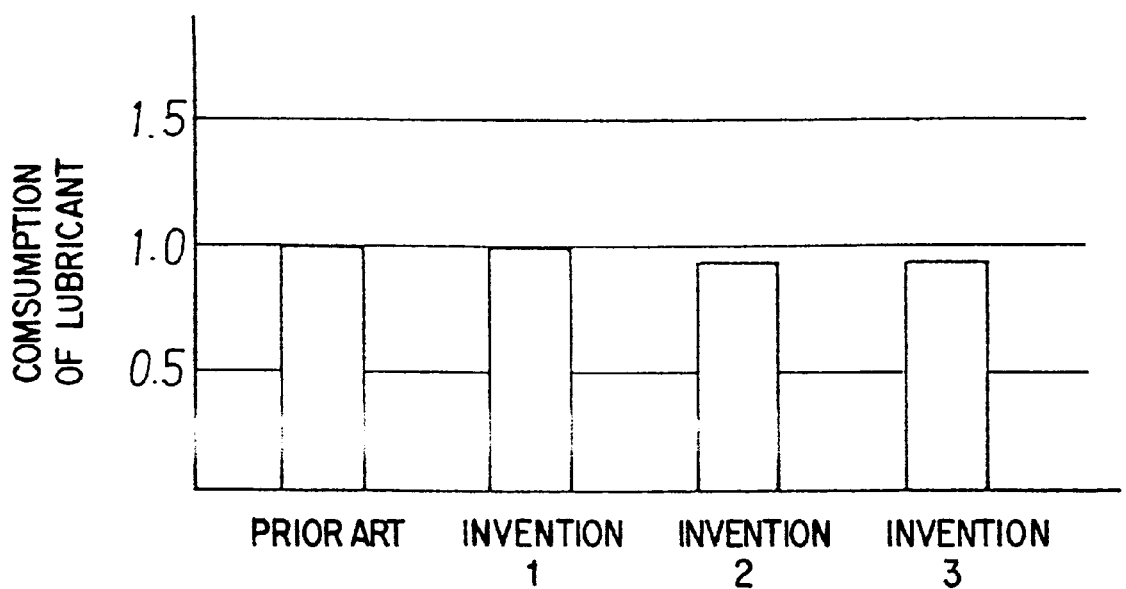
FIG. 4 is a diagram showing the amount of consumption of lubricant and advantageous effects of the invention.

In driving tests of an internal combustion engine in which the second pressure ring of the above described respective embodiments was mounted on a piston, no longitudinal scratching on the Al cylinder side was found in all cases. Also, FIG. 4 is a diagram showing the amount of consumption of lubricant for the respective embodiments of the second pressure ring in comparison with a prior art chromium plated one which is deemed to be "1". As FIG. 4 shows, the amount of consumption of lubricant at the respective second pressure rings embodied by the invention was nearly equal to that in the prior art.

Therefore, according to the present invention, excellent effects are obtainable which can provide, stably, a second pressure ring which keeps a scraping property better than the prior art as well as prevent an Al cylinder side from being scratched longitudinally.

Having now fully described the present invention, it will be understood that, for one of ordinary skill in the art, many changes and modifications can be made without departing from the spirit or scope of the invention as set forth herein.

The entire disclosure of Japanese Patent Application No. 60265/1997 filed on Mar. 14, 1997 including specification, claims, drawings and summary are incorporated by reference in its entirety.

What is claimed is:

1. A second pressure ring made of iron without plating thereon having an outer periphery and used for Al cylinders, an outer peripheral sliding surface of the second pressure ring being downwardly divergent so as to slant, wherein said second pressure ring includes, at a lower end of said outer peripheral sliding surface, an oppositely slanting, upwardly divergently worked portion in a range of less than 0.15 mm in its axial direction and a stepped shaped undercut at a lowermost portion of the outer periphery, and a junction between the outer peripheral sliding surface and the oppositely slanting worked portion is lapped for finishing.

2. The second pressure ring of claim 1, wherein the stepped shaped undercut is in the shape of a hooked section.

3. A method for producing a second pressure ring made of iron without plating thereon having an outer periphery and used for A1 cylinders, an outer peripheral sliding surface of the second pressure ring being downwardly divergent so as to slant, comprising:

working upwardly divergently so as to oppositely slant a worked portion at a lower end of the outer peripheral sliding surface of the second pressure ring in a range of less than 0.15 mm in its axial direction, and forming a stepped shaped undercut at a lowermost portion of the outer periphery, and finishing by lapping cylindrically a junction between the outer peripheral sliding surface and the oppositely slanting worked portion.

4. The method of claim 3, wherein forming a stepped shaped undercut includes forming an undercut in the shape of a hooked section.

5. A second pressure ring made of iron without plating thereon having an outer periphery and used for A1 cylinders, an outer peripheral sliding surface of the second pressure ring being downwardly divergent so as to slant and a lowermost portion of the outer periphery having a stepped shaded undercut, wherein said outer peripheral sliding surface is buffed, and a lower end of the outer peripheral sliding surface is lapped for finishing.

6. The second pressure ring of claim 5, wherein the stepped shaped undercut is in the shape of a hooked section.

7. A method for producing a second pressure ring made of iron without plating thereon having an outer periphery and used for A1 cylinders, an outer peripheral sliding surface of the second pressure ring being downwardly divergent so as to slant and a lowermost portion of the outer periphery having a stepped shaped undercut, comprising:

buffing the outer peripheral sliding surface, and lapping cylindrically a lower end of the outer peripheral sliding surface for finishing.

8. The method of claim 7, wherein the stepped shaped undercut is in the shape of a hooked section.

* * * * *